Patented May 14, 1946

2,400,099

UNITED STATES PATENT OFFICE 2,400,099

PROCESS FOR OBTAINING SHAPED ARTICLES

Merlin Martin Brubaker, Boothwyn, and William Edward Hanford, Easton, Pa., assignors to E. I. du Pont de Nemours & Company, Wilmington, Del., a corporation of Delaware No Drawing. Application October 25, 1943, Serial No. 507,632

4 Claims. (Cl. 18—55)

This invention relates to a process for obtaining shaped articles from polytetrafluoroethylene.

Polytetrafluoroethylene is described in United States Patent 2,230,654 as a white or brown powder or jelly which becomes incandescent in the presence of a flame but which does not burn when the flame is removed and melts only at red heat. This patent also states that by the use of sufficiently high pressure and temperature the polymer can be molded into articles which are relatively clear and colorless. However, methods generally used for shaping thermoplastics, such as injection molding and extrusion, have been impractical or uneconomical on a manufacturing scale because of the peculiar characteristics of polytetrafluoroethylene.

Polytetrafluoroethylene undergoes a reversible transition at 327° C. Above this temperature the polymer is transparent in thick sections, is markedly less crystalline as shown by X-ray diagrams, and has a very low tensile strength. On cooling below 327° C. the polymer becomes translucent or opaque, becomes more crystalline, and regains its tensile strength. However, above 327° C., and even at temperatures as high as 450° C., the polymer assumes none of the ordinary properties of a liquid or fluid. It retains its physical form and can be deformed under compressive stress only slowly indicating a very high viscosity. This behavior differs from that of other thermoplastics from which shaped articles can be obtained by conventional shaping techniques.

This invention has as an object a new and practical method for forming articles of polytetrafluoroethylene. A further object is a process which yields shaped polytetrafluoroethylene articles having improved properties. A still further object is the manufacture of polytetrafluoroethylene articles having superior tensile strength and flexibility. Other objects will appear hereinafter.

The above objects are accomplished by a method comprising shaping the polymer into the form of the desired article by subjecting discrete particles of the polymer to pressure, heating the shaped polymer to a temperature within the range of 327° to 500° C., and cooling the article obtained.

The best results are obtained when the polytetrafluoroethylene is as finely divided as possible. This fine subdivision can be achieved by preparing the polymer in a violently agitated system, or by subjecting the polymer to a mechanical subdividing step prior to pressing, such as micropulverization. The finely divided polymer is preferably shaped in the mold by cold pressing, namely, pressing at temperatures below 327° C., and usually at room temperature. Other methods for shaping the polymer can be used, such as illustrated in Example III.

Pressures of from 100 to 3000 lbs./sq. in. are usually those most desirably employed in shaping the polymer particles in the mold. In some instances, depending on the shape and size of the article, considerably lower pressures, for example, 25 lbs./sq. in., can be used. In other instances much higher pressures, up to 50,000 lbs. or more per square inch are used.

The heat treating or sintering step applied after removing the pressed article from the mold is best conducted at a temperature of from 327° to 400° C. and is continued until the entire mass of the article achieves a temperature of at least 327° C. The time required will vary with the dimensions of the article. This heating operation can be carried out in a number of ways, such as by heating in air, heating in the vapor of a boiling liquid, or by immersion in a hot liquid, such as hot oil, a molten inorganic salt or a mixture of these, or a molten metal or alloy.

It is quite surprising that a thermoplastic material can be sintered in this fashion without the use of any external means for retaining its shape. This unexpected property of polytetrafluoroethylene, unique among thermoplastics, enables us to carry out the heat-treating step quickly and without the use of any device to retain the shape of the pressed article. Such a process has many technical advantages, such as speed of operation and simple machinery requirements. For example, when producing articles on a large scale, the cold-formed articles can be conducted through a hot zone on a conveyor belt or on a conveyor chain, being attached thereto by tongs or other grasping devices. For similar reasons, operation in this fashion has considerable economic advantage over a process requiring the use of a mold at such elevated temperatures as are necessary to shape polytetrafluoroethylene. It is emphasized that this sintering operation, transforms the soft, weak, cold-pressed article into a tough, flexible piece. During this transformation the article retains its shape and in many cases no further shaping operations are required for utilization of the article. The sole dimensional change which results from this process is a shrinkage which can be predicted, thus permitting the production of articles having any desired dimensions.

The extent of the sintering period necessary to give uniform articles can be determined for an article of any dimensions by a simple experiment with a sample piece of such dimensions having a thermocouple in the center or centers of massive portions. An operating cycle can be set up for sintering pieces of such dimensions by noting the time required to achive a temperature of at least 327° C. throughout the mass.

At the conclusion of the heating or sintering operation, the article is removed from the hot zone and cooled. Articles particularly valuable with regard to resilience and toughness are obtained by forced cooling of the hot article as, for example, by quenching in a cold medium. This quenching operation can be conducted by subjecting the hot article to a blast of cold air or by immersing it in a cold liquid medium such as water, lubricating oil, quenching oil, or other organic liquids. Quenching of the sintered article is preferred where toughness, resilience, high tensile strength, and, in the case of thin articles, transparency, are desired.

The sintered article can also be cooled slowly instead of by quenching. This can be carried out, for example, by introducing the sintered article into a hot atmosphere or a hot liquid and slowly reducing the temperature of the medium. This controlled cooling is especially important in instances where distortion is likely to occur as in the preparation of intricately shaped articles. Another procedure is to surround the sintered article with insulating material such as magnesite, asbestos, etc., so that the temperature of the hot article is reduced slowly. Articles produced by this technique are somewhat softer and less stiff than quenched articles. They are often preferred for certain types of subsequent machining operations.

Articles prepared from polytetrafluoroethylene by the method described herein are tough, relatively hard, clear to opaque, depending upon the thickness, and are inert to the attack of organic and inorganic reagents. They have densities ranging from about 2.0 to about 2.2 at room temperature and a refractive index (sodium D line) of about 1.35.

The invention is further illustrated by the following examples.

*Example I*

A plug of polytetrafluoroethylene 0.5" in diameter and 0.7" long is pressed from small particles of the polymer in a mold at room temperature. The pressed article after being removed from the mold is then sintered by heating in a glass tube placed in a vapor bath of boiling retene (1-methyl-7-isopropyl phenanthrene, boiling point 394° C.) for 3 hours. The plug is cooled by removing the heat source under the retene. The resulting plug is sintered together into a tough mass.

*Example II*

A chip 2" in diameter and ⅜" thick is pressed from polytetrafluoroethylene powder at 25° C. under 500 lbs./sq. in. This chip is then immersed in a bath comprising a molten mixture of sodium nitrate and nitrite maintained at a temperature of 380° C. After ½ hour's immersion in this bath, the chip is removed and placed between two magnesite blocks so that it cools to room temperature over a period of 1 hour. The resulting tough, homogeneous chip conforms substantially to the cold pressed shape.

*Example III*

Powdered polytetrafluoroethylene is fed between a pair of smooth calender rolls having a clearance of about 1 to 2 mils. The resulting fragile cold rolled film is then sintered by passing through a furnace at a temperature of 400° C. with a contact time of about 1 minute, followed by quenching in cold water. The resulting product is a tough, flexible, homogeneous film of polytetrafluoroethylene. The strength and clarity of this film are further improved by cold rolling.

The density of the cold pressed object is generally greater than 1.4 and is often in the neighborhood of 1.8 to 2. The density of the sintered object will vary, depending upon the cold pressure previously employed and upon the state of subdivision of the polymer, from about 2 to about 2.2.

*Example IV*

Powdered polytetrafluoroethylene is placed in a mold at room temperature and compressed under a pressure of 1000 lbs./sq. in. into an annular ring one-half inch thick, eight inches outside diameter and four inches inside diameter. This ring is then removed from the mold and sintered by heating in a furnace at 355° C. for 6 hours. At the end of this time the sintered ring is removed from the furnace and quenched in cold water. The resulting ring is hard and tough. Despite a slight shrinkage incurred in the process the ring is symmetrical.

The polytetrafluoroethylene used in the process of this invention can be prepared by heating tetrafluoroethylene under superatmospheric pressure in the presence of a catalyst, for example, at a pressure above 1000 lbs./sq. in., a temperature of from 80°–150° C. and using oxygen or an organic peroxy compound as a catalyst. Lower temperatures and pressures are operable for this preparation although with an increase in the time required to effect the polymerization.

The heat treating or sintering operation which is carried out after removing the article from the mold in which it has been cold pressed can be satisfactorily carried out by subjecting the article to a hot atmosphere, such as, by heating in an electrical furnace, a gas furnace, or any other type of hot air heating device. Contrary to what might be expected of an organic material, it is not necessary to conduct this step in an inert atmosphere, since no deleterious effects result from heating the cold pressed article in air. This step can also be conducted by placing the pressed article in a hot liquid, such as a hot oil, a molten metal or alloy, or in a molten mixture of inorganic salts. This step can also be accomplished by methods involving the use of radiant energy or high frequency electrostatic fields.

It has been emphasized that no mold is required to cause the polymer to retain its shape during sintering. However, for the preparation of certain complex shapes, particularly where speed and economy of operation are not important, pressure can be applied to the article during the heat treating step. The application of pressure to the hot article can be effected in a number of ways. For example, the cold pressed article can be placed in a pressure chamber in a furnace and air or other gas under superatmospheric pressure can be applied to the article in this chamber during the heating period. Another way of accomplishing this is to place the cold pressed article in a metal chamber whose dimensions conform closely to those of the article and which is capable of being tightly closed.

This chamber is then subjected to heat treatment, and the expansion of the polymer in the metal chamber develops autogenous pressure during the heating. Still another possibility involves the use of a mold having movable sections through which pressure can be applied to the article while heating. This is less desirable than either of the former two methods in requiring more complex equipment and in failing to provide a uniform application of pressure to the sintered article in all directions. It is emphasized that the use of a mold in such circumstances is for the purpose of applying pressure while heating, and is not an essential feature of the invention.

The articles produced according to this invention can be cold worked, as for example, by rolling, drawing, pressing, hammering, etc. By such means the tensile properties of the polymer can be improved, particularly in the direction of the orientation which has been brought about by the cold working.

Articles of polytetrafluoroethylene can be converted into complex shapes by a variety of machining operations, such as, sawing, drilling, punching, shaping, milling, turning on a lathe and grinding. By these and other well known techniques articles of polytetrafluoroethylene having a wide variety of shapes and functions can be prepared.

The process of this invention can be used to form articles from not only pure polytetrafluoroethylene but also from mixtures of the polymer with other materials, such as copper, iron, lead, brass, bronze, graphite, asbestos, silica, calcium fluoride, sodium chloride, ammonium chloride, ammonium nitrate, titanium dioxide, etc. These materials are generally added in the powder form but in some instances can be added in the form of fibers, for example, asbestos, glass, etc.

The process is also applicable to the production of articles from copolymers of tetrafluoroethylene, particularly those containing substantial amounts of tetrafluoroethylene.

The present invention provides a method for the rapid and economical production of a variety of shaped articles of polytetrafluoroethylene, which have many valuable industrial applications because of their flexibility, toughness and resistance to mechanical shock and because of the polymer's unusual chemical inertness. The articles obtained by the present process are colorless, generally opaque, have a density of about 2.2 and are readily machined. For example, by this process can be fabricated liners for apparatus in which such corrosive materials as nitric acid, hydrofluoric acid, hydrochloric acid, alkalies, etc., are used, especially at elevated temperatures. This process can be adapted to the preparation of tubing which is well suited to the transport of corrosive liquids and gases. Gaskets, valve packing, pump diaphragms, and container closures, which are particularly useful where other materials fail to withstand corrosive attack or elevated temperatures can be prepared by this process. The process can be employed for the production of polytetrafluoroethylene bearings. Bearings obtained by this process at low cold pressures and low sintering temperatures have a porous structure. These can be soaked in oil and then employed as self-lubricating bearings, particularly where corrosion resistance is important to the operation. Non-lubricated bearings of polytetrafluoroethylene can also be used and such bearings can also be lubricated with water, graphite, greases, water-oil emulsions, etc.

The process claimed herein is applicable to the production of a wide variety of electrical insulating articles. The unique combination of excellent electrical properties with chemical inertness and thermal stability makes polytetrafluoroethylene valuable in a number of electrical applications. For example, this process can be adapted to the coating of wire, which insulated wire can be used to wind armatures and field coils of motors, especially motors which operate under heavy loads and high temperatures where resistance to oxidizing conditions is important. Such insulated wire is particularly useful in winding the armatures and field coils of refrigeration motors, where the chemical stability of the insulated wire is necessary because of the contact of the windings with chemically active refrigerants, such as sulfur dioxide and ammonia. The availability of large uniform sheets of polytetrafluoroethylene by this process provides means for their replacing mica as insulators for armature slots, commutator segments, and commutator V-rings. These applications are of particular value when it is desired subsequently to anneal the motor armature in order to obtain increased conductivity of the windings. Polytetrafluoroethylene coated wire can also be used advantageously in the winding of transformer coils and induction coils; also for ignition cables for internal combustion engines, particularly for airplanes and tanks, where extreme stability to oxidation, high temperature, and gasoline and lubricating oil is very important. Many applications for this wire arise in the fields of power and signal transmission. Such insulated wires are also extremely useful for electrical work in chemical plants because of their stability to all kinds of chemical attack.

Polytetrafluoroethylene fibers can be employed for fabricating woven or wrapped insulation for wires, as well as for making chemically resistant filter cloth, and chemical- and fire-resistant fabrics for innumerable uses.

Submarine and subterranean cables insulated with polytetrafluoroethylene are advantageous in that they have excellent electrical properties and that the polymer has essentially no tendency to cold flow under the conditions of use. These can be prepared by wrapping or weaving fibers or tapes of polymer around the conducting elements, or by sintering the polymer directly thereon.

Sheets and tapes of polytetrafluoroethylene can be employed advantageously in insulating spark plugs and as storage battery separators. Other electrical applications for sheets and tapes include spacers, supports, bases and sockets for radio tubes, and particularly as dielectrics for radio, telephone, rectifier and high frequency condensers. Application of this insulation as a condenser dielectric is particularly advantageous especially in frequency modulation transmitters and receivers because of the extremely low power loss of such condensers over a wide range of temperatures and of frequencies, at either low or high humidities.

Other uses of the present products in which the insulating properties of polytetrafluoroethylene are advantageous include forms for coils and resistors, spreaders, and insulators for lead-in wires, coupling for high voltage transmitting shafts, supports and films in transformers, supports for resistance heating elements, fuse plug windows, washers, bushings, radio transmitting crystal holders, transposition blocks, condenser bases, strain and stand-off insulators, and spacers for coaxial cables.

As many apparently widely different embodiments of this invention may be made without departing from the spirit and scope thereof, it is to be understood that we do not limit ourselves to the specific embodiments thereof except as defined in the appended claims.

We claim:

1. A process for obtaining articles of polytetrafluoroethylene which comprises the consecutive steps of shaping polytetrafluoroethylene into the form of the desired article by subjecting powdered polytetrafluoroethylene at a temperature below 327° C. in a mold to a pressure of at least 100 lbs./sq. in., removing the shaped article from the mold, heating the shaped article within the range of 327° C. to 500° C., continuing the heating until the article is heated throughout to a temperature of at least 327° C., and cooling the article thus obtained.

2. The process set forth in claim 1 in which the powdered polymer is cold pressed at a pressure of from 100 to 3000 lbs./sq. in. and in which the heating of the shaped article is at a temperature of from 327° C. to 400° C.

3. The process set forth in claim 1 in which said cooling consists in quenching the article in a liquid.

4. The process set forth in claim 1 in which said cooling consists in restricting the normal rate of cooling of the article and gradually diminishing its temperature.

MERLIN MARTIN BRUBAKER.
WILLIAM EDWARD HANFORD.